(12) United States Patent
Carter (10) Patent No.: US 7,676,759 B2
(45) Date of Patent: Mar. 9, 2010

(54) METHOD AND APPARATUS FOR SEARCHING DATA

(75) Inventor: John Mervyn Carter, Southampton (GB)

(73) Assignee: International Business Machines Corporation, Armonk, NY (US)

( * ) Notice: Subject to any disclaimer, the term of this patent is extended or adjusted under 35 U.S.C. 154(b) by 913 days.

(21) Appl. No.: 11/202,889

(22) Filed: Aug. 12, 2005

(65) Prior Publication Data

US 2006/0036942 A1    Feb. 16, 2006

(30) Foreign Application Priority Data

Aug. 12, 2004  (GB)  .................... 0417953.7

(51) Int. Cl.
*G06F 3/00*  (2006.01)
(52) U.S. Cl. .............. 715/783; 715/732; 715/721; 715/786; 715/784; 715/787; 715/830
(58) Field of Classification Search .......... 715/732, 715/721, 783, 786, 784, 787, 830
See application file for complete search history.

(56) References Cited

U.S. PATENT DOCUMENTS

| 5,371,846 | A | | 12/1994 | Bates | ................. | 395/157 |
|---|---|---|---|---|---|---|
| 5,550,559 | A | * | 8/1996 | Isensee et al. | ................. | 345/684 |
| 5,859,638 | A | * | 1/1999 | Coleman et al. | ............ | 715/786 |
| 6,147,683 | A | | 11/2000 | Martinez et al. | ............ | 345/341 |
| 6,157,381 | A | | 12/2000 | Bates et al. | ................. | 345/341 |
| 6,166,733 | A | * | 12/2000 | Yamada | ...................... | 715/776 |
| 6,208,343 | B1 | | 3/2001 | Roth | ........................ | 345/341 |
| 6,252,597 | B1 | * | 6/2001 | Lokuge | ...................... | 715/841 |
| 6,448,985 | B1 | | 9/2002 | McNally | ..................... | 345/784 |
| 2002/0063737 | A1 | | 5/2002 | Feig et al. | .................. | 345/786 |
| 2002/0109728 | A1 | | 8/2002 | Tiongson et al. | ............ | 345/786 |

OTHER PUBLICATIONS

IBM Technical Disclosure Bulletin, vol. 37, No. 02B, Feb. 1994 Indexed Scroll Bar.

* cited by examiner

*Primary Examiner*—Weilun Lo
*Assistant Examiner*—Mylinh Tran
(74) *Attorney, Agent, or Firm*—Joseph E. Bracken, Esq.; Steven M. Greenberg, Esq.; Carey, Rodriguez, Greenberg & Paul, LLP (57) ABSTRACT

A method and apparatus is disclosed which provide a scroll bar for use with a display device. The scroll bar has an index and the data displayed on the display device is presented according to the index. In response to user commands the method and apparatus provide additional nested indexes for the displayed data.

3 Claims, 7 Drawing Sheets

| Name | Date | Author |
|------|------|--------|
| Articles | 15 / 1 / 2003 | fsr |
| Bids | 12 / 7 / 2000 | tbq |
| Cards | 8 / 9 / 2001 | nds |
| Delivery | 23 / 2 / 2002 | roc |
| Entries | 14 /12 / 2004 | jin |
| Ended | 31 /10 / 2000 | per |
| Forecast | 29 / 3 / 2004 | srt |
| GDP | 3 / 7 / 2003 | mps |

Scroll index: A, B, C, D, E, F, G, H, I, J, K, L, M, N, O-Z

FIG. 2b

| Name | Date | Author |
|------|------|--------|
| House 1 | 3 / 5 / 2003 | mps |
| House 2 | 29 / 3 / 2004 | srt |
| House 3 | 31 /10 / 2000 | per |
| House 4 | 14 /12 / 2003 | roc |
| House 5 | 23 / 2 / 2002 | jin |
| House 6 | 8 / 9 / 2003 | nds |
| House 7 | 1 / 8 / 2001 | tbq |
| House 8 | 2 / 6 / 2003 | fsr |

Scroll index: A-D, E, F, G, H, 2000, 2001, 2002, 2003, 2004, I, J, K, L, M-Z

METHOD AND APPARATUS FOR SEARCHING DATA

BACKGROUND OF THE INVENTION

The present invention relates to a method and apparatus for searching data for display on a display device. More particularly, but not exclusively, the present invention relates to graphical user interfaces (GUIs) which help a user to-search for desired elements of data.

GUIs commonly use a window to display data, the window having one or more associated scroll bars. The scroll bars normally form part of a border of the window and have sliders movable by a user along the length of the scroll bar. Such movement of the slider results in movement of the data displayed in the window.

Scroll bars are used when all the data will not fit into the window. If, for example, the data is a list of items, then part of the list is displayed and the scroll bar used to move the list relative to the window so that all parts of the list data can be viewed. In this way a small window can be used to view large sets of data.

U.S. Pat. No. 5,550,559 discloses a GUI with a scroll bar for displaying lists of data. The scroll bar background displays an index to the list of data. Each line of the list of data elements is represented by an element in the index. The slider is also sized to cover the elements in the index whose corresponding data elements are currently displayed in the window. The index in the scroll bar enables the user to move the data in the viewing window so as to display desired elements.

SUMMARY OF THE INVENTION

The present invention includes, but is not limited to, a method, system and computer usable medium for displaying a scroll bar on the display device; providing a first index associated with the scroll bar, the first index comprising a plurality of selectable index points; receiving a first user selection of a selected index point within the first index; and, in response to the first user selection, providing a second index associated with the scroll bar, the second index comprising a plurality of selectable index points.

BRIEF DESCRIPTION OF THE DRAWINGS

Embodiments of the invention will now be described, by way of example only, with reference to the accompanying drawings in which.

DETAILED DESCRIPTION OF A PREFERRED EMBODIMENT OF THE INVENTION

Figure 1:
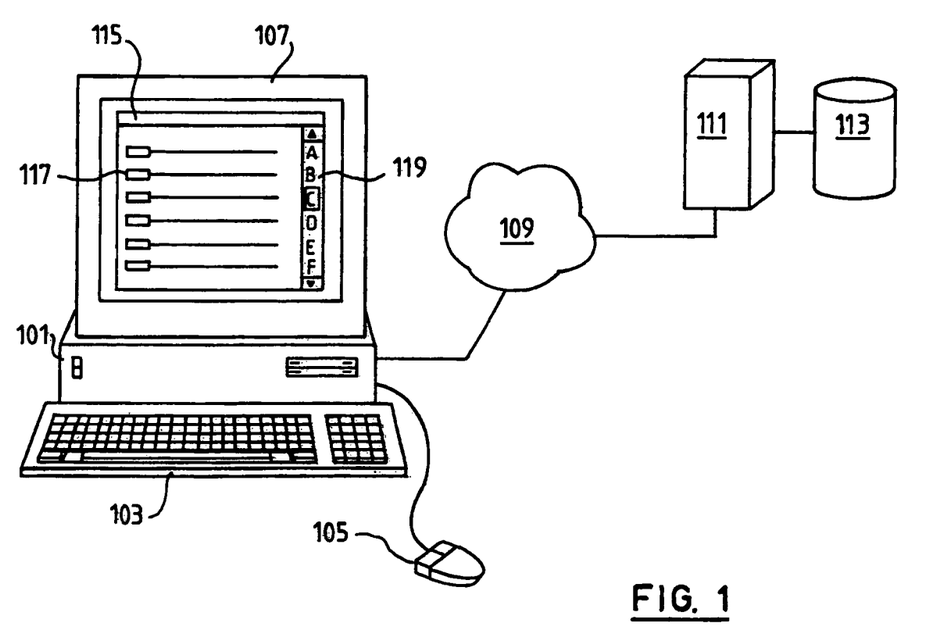
FIG. 1 illustrates a representative hardware environment in accordance with an embodiment of the present invention.

FIG. 1 shows a computer 101 connected to a keyboard 103 and a mouse 105. The computer 101 is also connected to a display device 107 in the form of a visual display unit (VDU). The mouse 105 is operable by the user to control the position of a pointer (not shown) on the display device. The mouse also has left and right buttons (not shown) which are operable by the user to select and invoke functionality on the display device 107 where the pointer is located. Such user selection using the mouse 105 is referred to herein as clicking.

The computer 101 is connected via network 109 to a server computer 111 and a database 113. The computer runs a windows-based operating system which displays a window 115 on the VDU 107 to communicate data 117 from an application program (not shown) to a user as described in further detail below. The application program is a database client program which operates in response to user input to retrieve data from the database 113 via the server computer 111 and the network 109. The window 115 has a scroll bar 119 on one of its borders which enables a user to manipulate the view of the data 117 within the window 115.

Figure 2A:
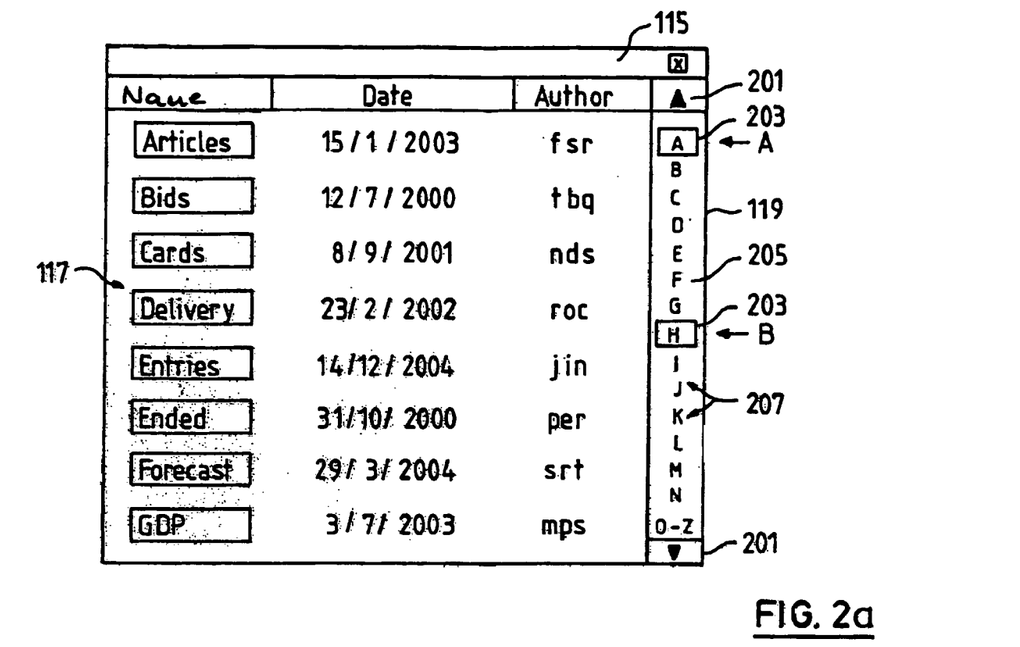
FIGS. 2a to 2d illustrate the operation of a scroll bar in accordance with an embodiment of the present invention.

FIG. 2a shows the window 119 in further detail displaying the data 117 as a list of data entries, not all of which can be displayed within a single window. Each entry comprises a plurality of data fields including "Name", "Date" and "Author". The displayed data entries are arranged according to the alphabetical order of their Name, data field. The scroll bar 119 has a scroll button 201 at each end and a slider 203 shown at position A on the scroll bar 119 and movable along its length. The relative position of the slider 203 along the scroll bar 119 corresponds to the relative position of the displayed data 117 within the list of data as a whole. The scroll buttons 201 are operable by the user using the mouse 105 and its associated pointer to cause line by line movement of the displayed data 117 up or down relative to the window 115. In addition, the space immediately below the upper button 201 and immediately above the lower button 201 can be clicked by the user to move the data 117 up or down page by page. When the scroll buttons 201 are used to move the data 117, the slider is correspondingly repositioned.

The slider 203 is also movable using the mouse 105 and its associated pointer. The slider can be selected by clicking and holding the left button of the mouse and can then be dragged to any position along the scroll bar. If at a given position the slider is released by release of the left button, the data 117 is repositioned accordingly relative to the window 115. This process is commonly referred to as drag and drop. If, however, the slider is not released but held over a particular position then additional functionality is invoked as described in detail below. The act of holding the slider, unreleased at a given position is referred to herein as hovering.

A panel 205 is positioned along the length of the scroll bar 119 between the scroll buttons 201. The panel displays an alphabetic index 207 linearly along its length which corresponds to the ordering of the data 117 in the window 115 with respect to the "Name" field. The position A of the slider 203 overlaying the letter "A" of the index 207 indicates the point in the index from which the display of the data entries begins.

Figure 2B:
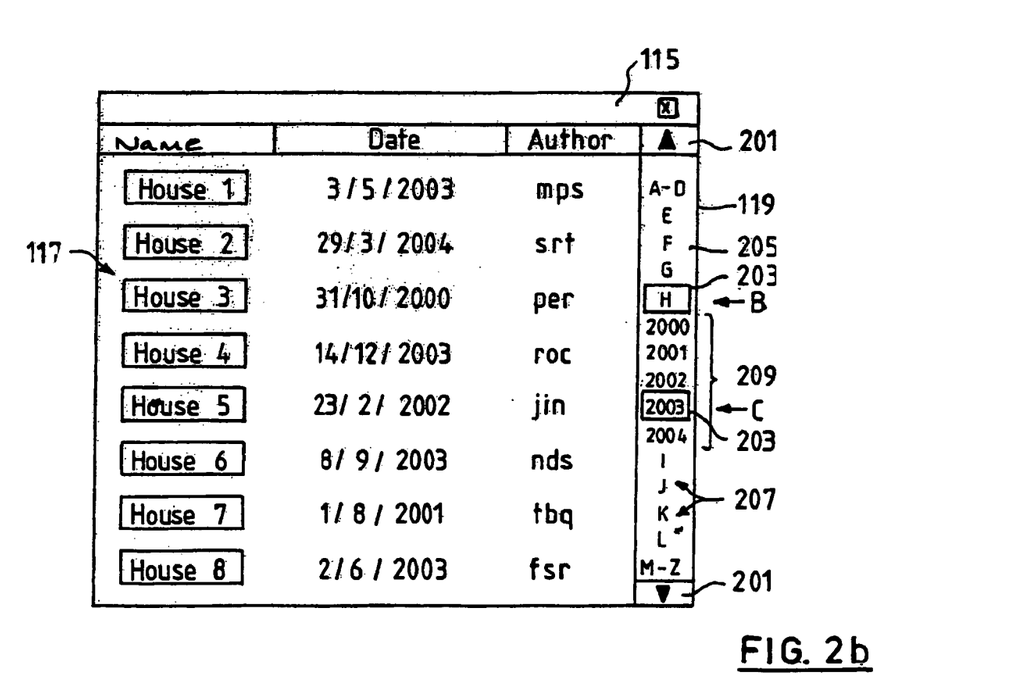

When the user moves the slider 203 to position B overlying the letter "H" in the index and hovers at that point, a second index 209 is displayed as shown in FIG. 2b. The second index 209 is displayed nested within the first index 207 at the position B at which the user caused the slider 203 to hover. The second index 209 is selected from a predetermined list of indexes which will be described in further detail below. The extremity of the first index 207 is abbreviated (t to z) to enable the second index 209 to be fully displayed in the panel 119. The second index 209 is a year index to be applied by the application program to the "Date" field of the data. The first index 207 is effectively used to select a first subset of the data and the second index 209 is used to select a second subset of the data.

Figure 2C:
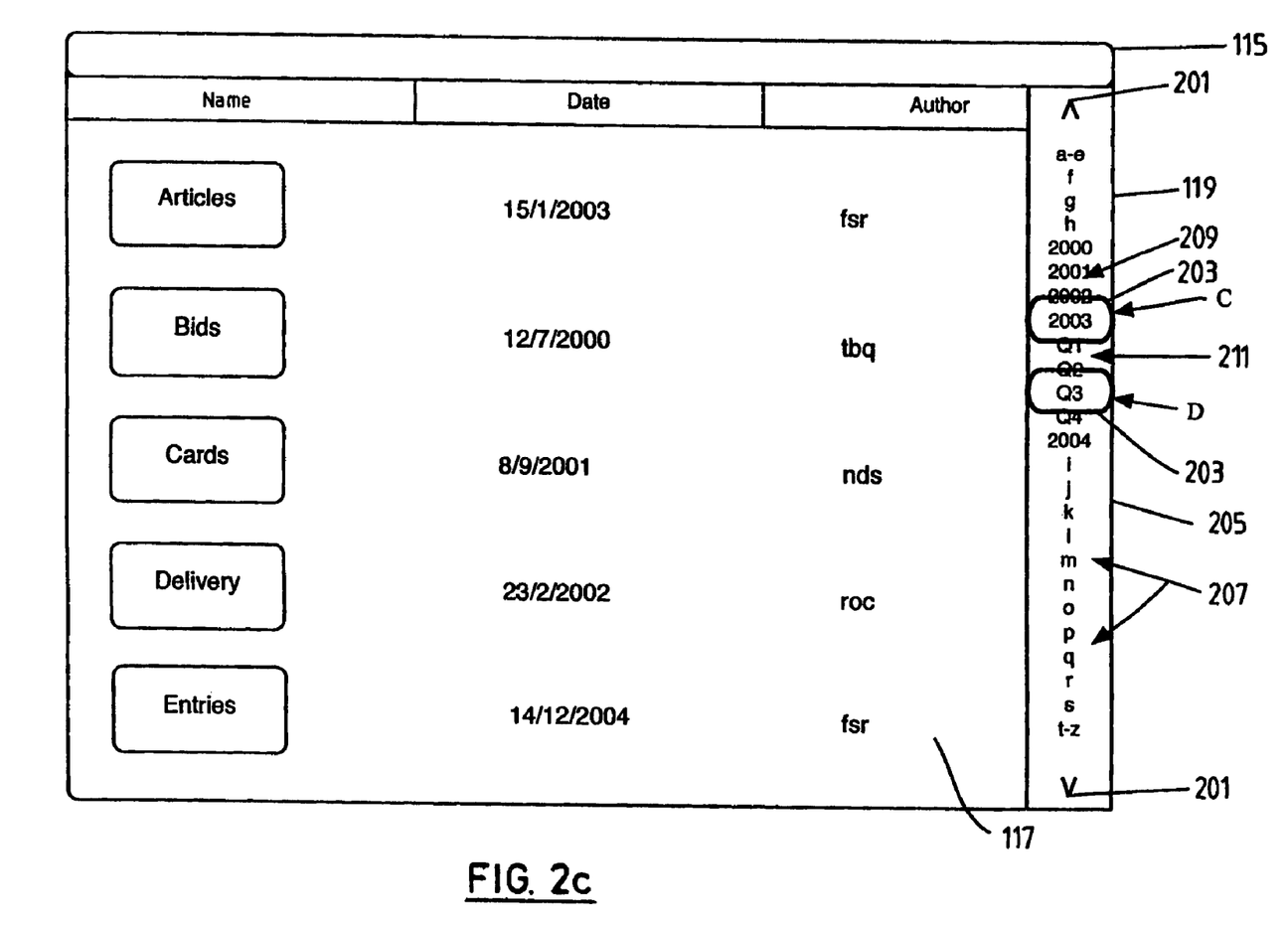

When the user positions and hovers the slider 203 at point C overlying the "2003" element of the second index 209, then a third index 211 is displayed as shown in FIG. 2c. The third index 211 is selected from the predetermined list and displayed nested within the second index 209 at the position C.

The third index 211 is a year quarter index again to be applied by the application program to the "Date" field of the data.

Figure 2D:
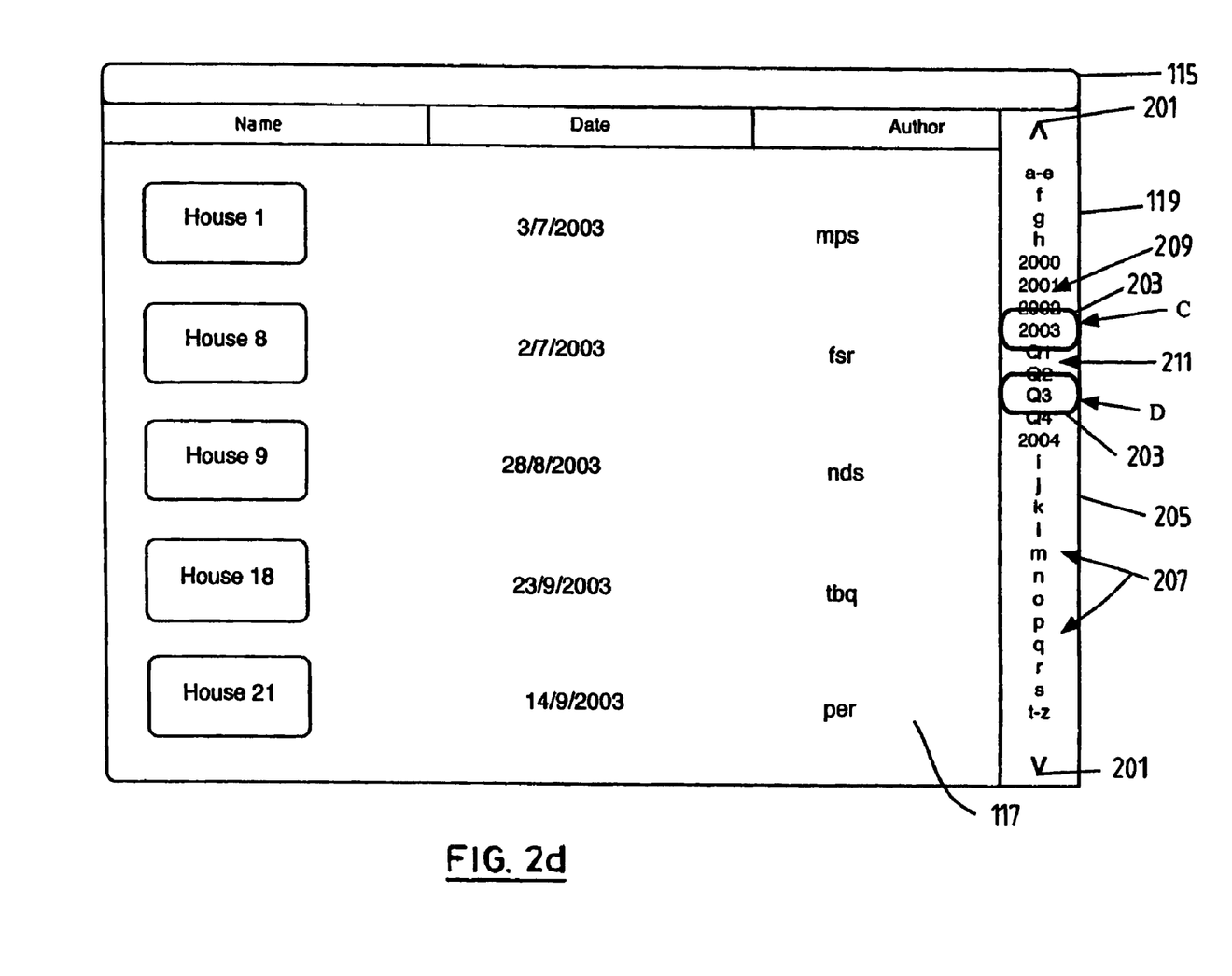

When the user moves the slider 203 to point D overlying the "Q3" element of the third index 211 and releases the slider at that point, the data is displayed as shown in FIG. 2d. The data 117 is presented firstly alphabetically on the "Entries" field starting from "H" and then on the "Date" field by the year "2003" and then quarter "Q3". In other words, each index selects a subset of the data 117 relating to the points B, C and D of the respective indexes. When the slider is released, the intersection of the three subsets is displayed in the window 115.

The user input commands referred to above are input by the user via the keyboard 103 or the mouse 105. The commands are summarised in the table below.

| Input Command | Action |
| --- | --- |
| Click the up/down scroll buttons or adjacent spaces. | Incrementally scrolls the display and slider line by line or page by page respectively. |
| Drag & drop slider at a given position. | Redisplays data and slider at the given position. |
| Left click index panel away from slider. | Moves the slider and display to the indicated position. |
| Hover slider over a given index position. | Expands to the next nested index at the given index. |

Figure 3:
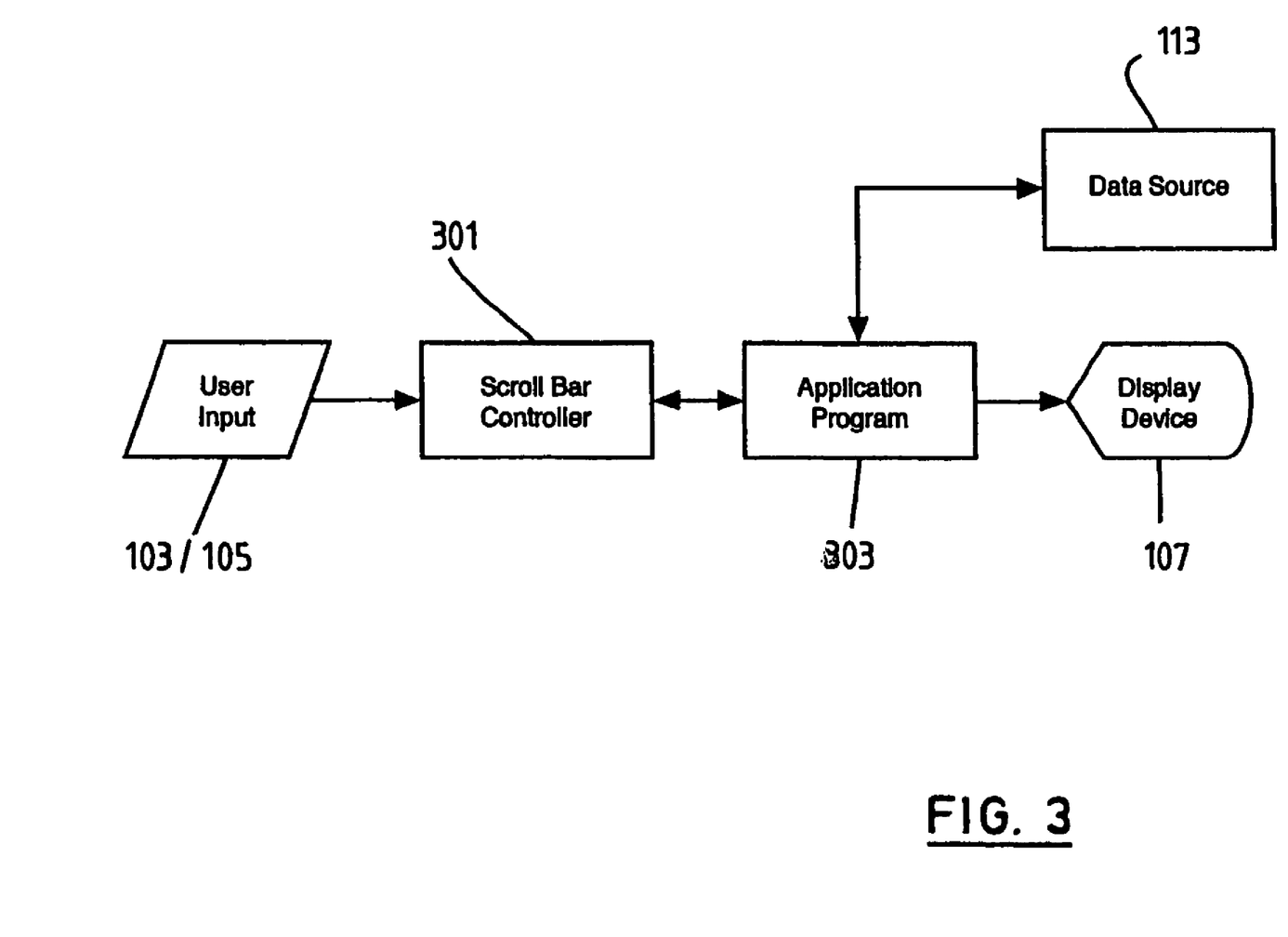
FIG. 3 illustrates the software environment in accordance with an embodiment of the present invention.

With reference to FIG. 3, the performance of the scroll bar 119 is controlled by a scroll bar controller program 301 in accordance with index data received from the database application program 303. The controller program 301 takes as its input the user commands via the scroll bar 119 summarised in the table above and controls the scroll bar accordingly. In response to notifications from the scroll bar controller program 301, the application program 303 communicates with the server computer 111 to retrieve appropriate data form the database 113, manipulates the retrieved data and displays it in the window 115 as described above.

In summary, the application program 303 uses the scroll bar controller 301 to display and operate the scroll bar and to receive user input and pass such input to the application in the format described above. The application program is responsible for retrieving, manipulating and displaying the data. In addition, the application program defines the indexes and holds the list of indexes which can be used as described above for navigating and organising the data. It should be noted that within the scroll bar controller there is no link between the indexes and any field of the data.

The communications between the controller 301 and the application 303 follow a message protocol. The application program 303 sends the scroll bar controller 301 instruction for creating an indexed scroll bar using a message which defines the total number of nesting levels, each index in the scroll bar by the nesting level, the collating sequence, and high/low bounds for the sequence. The format of the message is set out below:

| | | | |
| --- | --- | --- | --- |
| <Create> | <Number of Index Levels = n> | | |
| <Index Level = 1> | <Collating Sequence Code> | <Low Bound> | <High Bound> |
| <Index Level = 2> | <Collating Sequence Code> | <Low Bound> | <High Bound> |
| <Index Level = 3> | <Collating Sequence Code> | <Low Bound> | <High Bound> |
| <Index Level = n> | <Collating Sequence Code> | <Low Bound> | <High Bound> |

The collating sequences, which are the basis of the indexes, are defined by collating sequence codes. Examples of these codes are as follows:

| | | |
| --- | --- | --- |
| Alphabetic | Aa | |
| Numeric | Nn | |
| Hexadecimal | Hh | |
| Octal | Oo | |
| Date | Dddmmyyyy | (12/10/2002) |
| | Dmmddyyyy | (10/12/2002) |
| | Ddddyyyy | (285/2002) |
| | Dddmmmyyyy | (12/OCT/2002) |
| Month | Mm | (Jan, Feb, . . . Dec) |
| Day | Dd | (Sun, Mon, Tue, Wed, Thu, Fri, Sat) |
| Time | Thhmmss | (13:20:46) |

In response to the selection of a nested index item by the user as described above with reference to FIGS. 2a to 2d, a message is sent to the application program which defines the user response by the number of index levels used, the element from each index at which the subsequent index was invoked and the corresponding collating sequence. This message has the following format:

| | | |
| --- | --- | --- |
| <User Response> | <Number of Index Levels Used = n> | |
| <Index Level = 1> | <Collating Sequence Code> | <Selection String> |
| <Index Level = 2> | <Collating Sequence Code> | <Selection String> |
| <Index Level = 3> | <Collating Sequence Code> | <Selection String> |
| <Index Level = n> | <Collating Sequence Code> | <Selection String> |

Figure 4:
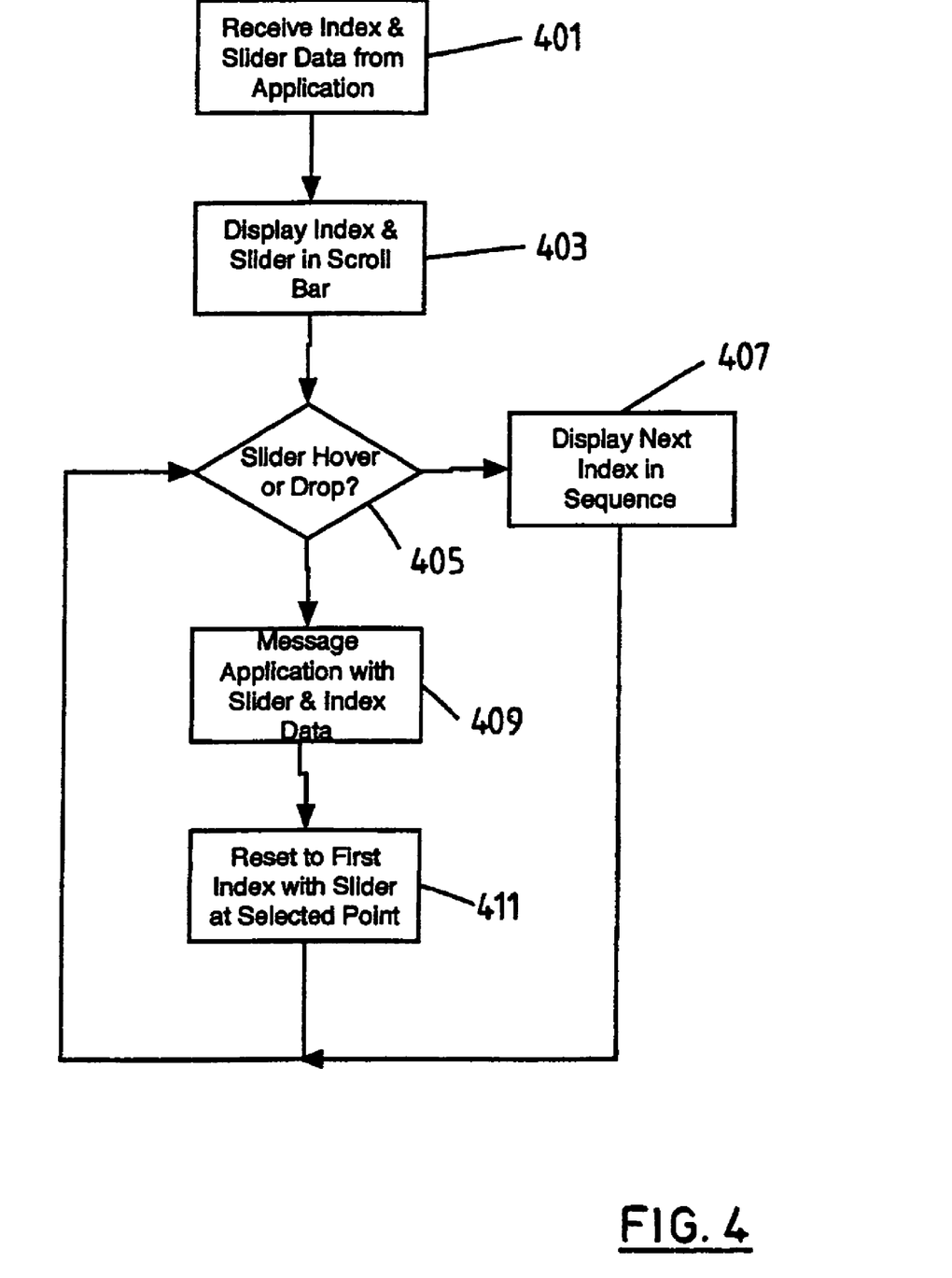
FIG. 4 is a flow chart of the logical flow in accordance with an embodiment of the present invention.

The performance of the scroll bar controller 301 in relation to the performance of the nested indexes will now be described further with reference to the flow chart of FIG. 4. At step 401, the controller has been initialised by the application program and receives a message from the application which defines each level of the index in full. Processing then moves to step 403 where the controller displays the first index string on the panel of the scroll bar and displays the slider at the beginning of the first index. Processing then moves to step 405 and waits for the user to input one of the commands in table 1 above.

If at step 405 the user hovers the slider over the scroll bar then processing moves to step 407 where the controller records the position on the scroll bar and displays the next index in the sequence nested within the first index. Processing then returns to step 405.

If at step 405 the user releases or drops the slider then processing moves to step 409 where a message as defined above is sent to the application program. Processing then moves to step 411 where the indexes in the scroll bar are reset to display the first index only but with the slider displayed at the first selected position. In response to the message at step 409, the application program redisplays the data accordingly. Processing then returns to step 405 to await further user input.

If in the process described above the application determines that there is a no-match condition, that is, no data corresponds to the selected index elements, then the application displays the last element of the data relating to the index element prior to the non-matched element. In other words, if no data had matched the "Q3" element in the example above then the application would display the last data element related to the prior index element in the order of the index, i.e. "Q2" if it exists, or "Q1" and so on back through the levels of the index.

Figure 5:
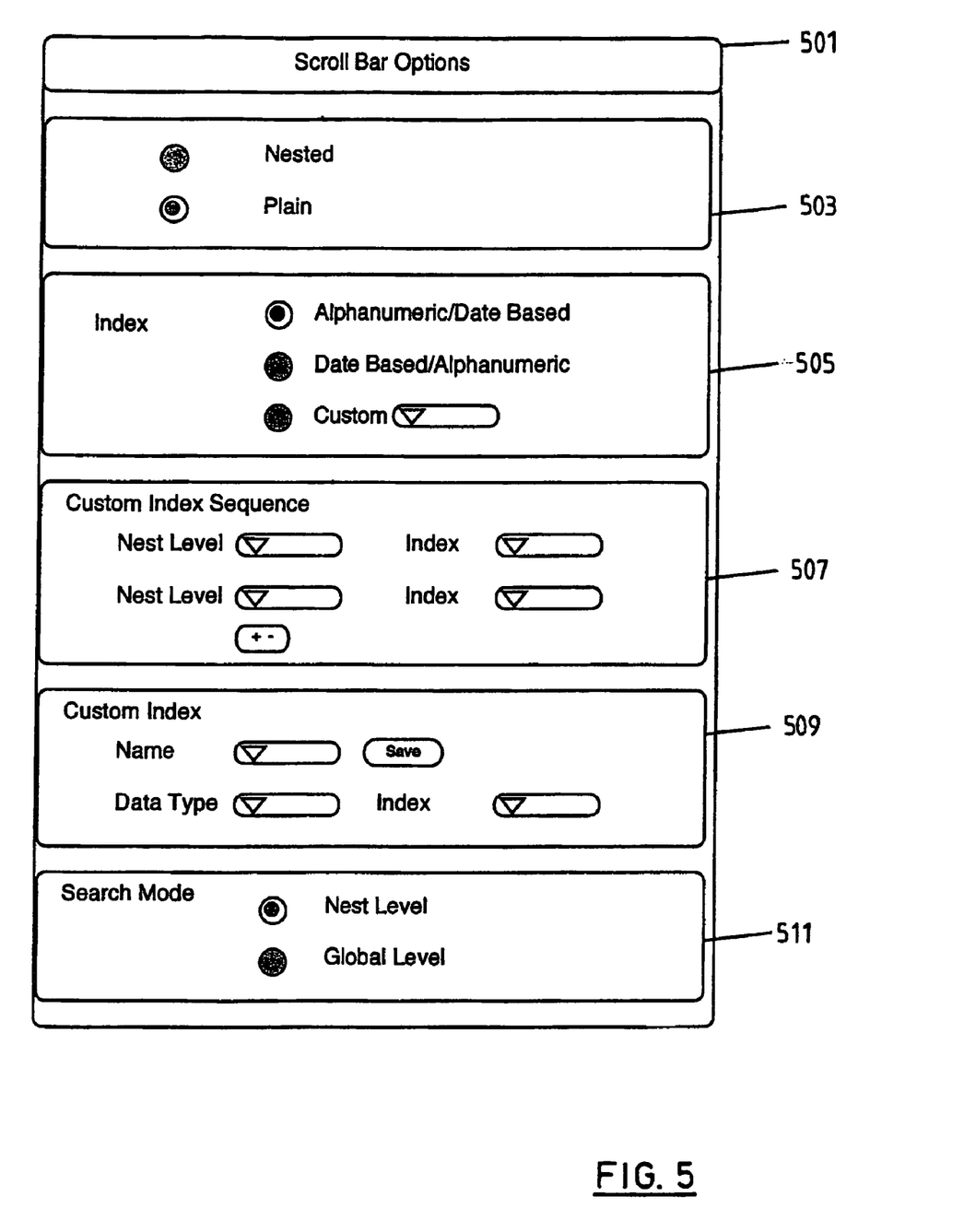
FIG. 5 illustrates a user interface in accordance with an embodiment of the present invention.

FIG. 5 shows a scroll bar options menu 501 provided by the application program which enables the user to control aspects of the performance of the scroll bar 119. The first option 503 provides a choice between the indexes being displayed in a nested format on the scroll bar or in a plain format in which successive levels of index are displayed on the scroll bar adjacently. The second "Index" option 505 provides choices of index sequence. In the Alphanumeric/Date Based option the first index is alphanumeric and the second index is date based. In the second choice the indexes are in the opposite order. The third choice enables a user defined custom index sequence to be selected.

The third "Custom Index Sequence" option 507 allows the user to define a sequence of indexes by choosing nesting levels and corresponding predefined index types from drop down menus which can then be named and saved. The saved custom indexes can then be selected for use from the "Index" option 505 above.

The fourth "Custom Index" option 509 allows the user to define an index by choosing from a list of indexable data elements and corresponding indexes on which a given element can be indexed. The user is also able to determine the start and end values by deleting elements from any given index. The indexable data elements and corresponding indexes are defined by the application program. The custom index can be saved under a user defined name and then appears as an index option in the third option 505 above so that the custom index can used in a custom index sequence.

The fifth "Search Mode" option 511 gives the user the choice of whether a search term entered using a search choice from an options menu (not shown) is applied globally to the data or restricted to the current nesting level index.

In alternative embodiments, various sequences of indexes can be applied to the data in different ways. For example, alphabetic indexes may be provided at each level of nesting, each being applied to successive letters of a word or name relating to the data. In other words, the sequence of alphabetical indexes would give 26 choices at each level of nesting providing a compact and efficient mechanism to carry out a full search of data such as a dictionary or telephone book.

In the embodiment described above with reference to FIGS. 2a to 2d, the first index is abbreviated at one end when there is insufficient space on the scroll bar to display it fully. An alternative mechanism in this situation is to omit elements of the index from to display so as to save space. For example, every other letter from an alphabetical index could be omitted to make the index more compact. The user is then able to select the non-displayed index elements by placing the slider over the spaces between the displayed elements.

Moreover, in the preferred embodiment the index element marks are related to the data in a non-linear manner. This means that no visual clue as to how much presentable data exists between index marks on the scroll bar. This leads to a number of advantages. For example, user manipulation of the data, such as additions to or deletions from the presentable data, do not require the index marks on the display to be reformatted or moved.

In the embodiments described above with reference to FIGS. 2a to 2d, the data is only redisplayed when the user drops the slider at a given point thereby indicating that the selection from the nested indexes is complete. In an alternative embodiment, the data could be redisplayed after each selection in each index.

In the above embodiments, various methods for the user to make selections are described. However, as will be appreciated by those skilled in the art, the user selection may be made by any suitable input means or combination thereof.

The embodiment described above illustrates the invention in the context of a computer in a client/server environment. In other embodiments the invention is applied to a stand alone computer. As will be understood by those skilled in the art, the invention is applicable to any device which includes a display such as a telephone, mobile telephone, personal digital assistant (PDA), gaming machine, television, instruments in a vehicle such as a car or aeroplane. In other words, the invention can be applied to any display in which the data displayed is manipulated by a user. In alternative embodiments, different user inputs may be used to initiate the commands described with reference to table 1 above.

It will be understood by those skilled in the art that the apparatus that embodies a part or all of the present invention may be a general purpose device having software arranged to provide a part or all of an embodiment of the invention. The device could be a single device or a group of devices and the software could be a single program or a set of programs. Furthermore, any or all of the software used to implement the invention can be communicated via various transmission or storage means such as computer network, floppy disc, CD-ROM or magnetic tape so that the software can be loaded onto one or more devices.

While the present invention has been illustrated by the description of the embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details representative apparatus and method, and illustrative examples shown and described. Accordingly, departures may be made from such details without departure from the spirit or scope of applicant's general inventive concept.

The invention claimed is:

1. A computer implemented method for displaying data on a display device, the method comprising the steps of:
   displaying a scroll bar on the display device;
   providing a first index associated with the scroll bar, the first index comprising a plurality of selectable index points;
   receiving a first user selection of a selected index point within the first index;
   in response to the first user selection, providing a second index associated with the scroll bar, the second index comprising a plurality of selectable index points;
   receiving a second user selection of a selected index point within the second index;
   in response to the second user selection, displaying data associated with the selected index points within the first and second indexes, wherein the data comprises a plurality of data entries, and each data entry comprises first and second data fields, and wherein the first index is associated with the first data field, and the second index is associated with the second data field;

displaying the first index within the scroll bar; and displaying the second index nested within the first index.

2. A computer-usable medium embodying computer program code, the computer program code comprising computer executable instructions configured to:

display a scroll bar on the display device;

provide a first index associated with the scroll bar, the first index comprising a plurality of selectable index points;

receive a first user selection of a selected index point within the first index;

in response to the first user selection, provide a second index associated with the scroll bar, the second index comprising a plurality of selectable index points;

receive a second user selection of a selected index point within the second index;

in response to the second user selection, display data associated with the selected index points within the first and second indexes, wherein the data comprises a plurality of data entries, and each data entry comprises first and second data fields, and wherein the first index is associated with the first data field, and the second index is associated with the second data field;

display the first index within the scroll bar; and display the second index nested within the first index.

3. A system comprising:

a computer;

a display screen; and a computer-usable medium embodying computer program code, the computer program code comprising instructions executable by the computer and configured to:

display a scroll bar on the display device;

provide a first index associated with the scroll bar, the first index comprising a plurality of selectable index points;

receive a first user selection of a selected index point within the first index;

in response to the first user selection, provide a second index associated with the scroll bar, the second index comprising a plurality of selectable index points;

receive a second user selection of a selected index point within the second index;

in response to the second user selection, display data associated with the selected index points within the first and second indexes, wherein the data comprises a plurality of data entries, and each data entry comprises first and second data fields, and wherein the first index is associated with the first data field, and the second index is associated with the second data field;

display the first index within the scroll bar; and display the second index nested within the first index.

* * * * *